United States Patent
Mitsumoto

(10) Patent No.: US 8,115,669 B2
(45) Date of Patent: Feb. 14, 2012

(54) VEHICULAR RADAR DEVICE

(75) Inventor: Masashi Mitsumoto, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 43 days.

(21) Appl. No.: 12/715,902

(22) Filed: Mar. 2, 2010

(65) Prior Publication Data

US 2011/0068970 A1      Mar. 24, 2011

(30) Foreign Application Priority Data

Sep. 18, 2009   (JP) ................................. 2009-216809

(51) Int. Cl.
*G01S 13/42* (2006.01)
*G01S 13/93* (2006.01)

(52) U.S. Cl. .......... 342/70; 342/107; 342/108; 342/115; 342/141

(58) Field of Classification Search .............. 342/70–72, 342/107–108, 113, 115, 141, 189
See application file for complete search history.

(56) References Cited

U.S. PATENT DOCUMENTS

| | | | | |
|---|---|---|---|---|
| 5,638,281 A | * | 6/1997 | Wang | 701/301 |
| 5,805,104 A | * | 9/1998 | Kunert | 342/109 |
| 6,018,309 A | * | 1/2000 | Mitsumoto et al. | 342/109 |
| 6,380,885 B2 | * | 4/2002 | Shirai et al. | 342/70 |
| 6,795,012 B2 | * | 9/2004 | Nakanishi et al. | 342/70 |
| 7,586,436 B2 | * | 9/2009 | Wakayama et al. | 342/147 |
| 7,911,374 B2 | * | 3/2011 | Moriuchi et al. | 342/70 |
| 7,924,215 B2 | * | 4/2011 | Nakanishi | 342/109 |
| 2002/0049539 A1 | * | 4/2002 | Russell et al. | 701/301 |
| 2002/0180633 A1 | * | 12/2002 | Nakanishi et al. | 342/70 |
| 2011/0068970 A1 | * | 3/2011 | Mitsumoto | 342/70 |

FOREIGN PATENT DOCUMENTS

| | | |
|---|---|---|
| JP | 2002-228749 A | 8/2002 |
| JP | 3733863 B2 | 8/2002 |
| JP | 2003-517151 A | 5/2003 |

* cited by examiner

*Primary Examiner* — John Sotomayor
(74) *Attorney, Agent, or Firm* — Sughrue Mion, PLLC

(57) ABSTRACT

Provided is a vehicular radar device which is capable of reducing an operation resource quantity necessary for a process of estimating an axis deviation angle in a radar measurement coordinate system, to thereby reduce a device size. The vehicular radar device includes: a measurement unit that measures an azimuth angle and a relative Doppler velocity; an extraction/accumulation unit that extracts target information satisfying conditions related to the relative Doppler velocity, a travel speed and a turning velocity, and accumulates the azimuth angle and a velocity ratio obtained by dividing the relative Doppler velocity by the travel speed of the subject vehicle among the extracted target information; and an axis deviation angle estimate unit that reads the target information accumulated in the extraction/accumulation unit, and estimates an axis deviation angle of the measurement coordinate system of a radar based on a second-order polynomial expression of the azimuth angle of the target.

7 Claims, 3 Drawing Sheets

STATE OF NO AXIS DEVIATION

STATE OF AXIS DEVIATION

IDEAL STATE

AXIS DEVIATION
EXAMPLE I

AXIS DEVIATION
EXAMPLE II

VEHICULAR RADAR DEVICE

BACKGROUND OF THE INVENTION

1. Field of the Invention

The present invention relates to a vehicular radar device having a radar to be mounted on a vehicle, which detects an object existing in the periphery of a subject vehicle (hereinafter, referred to as "target") and measures a position and a velocity of the target, and more particularly, to a vehicular radar device which is capable of estimating and correcting a reference axis deviation angle (hereinafter, referred to as "axis deviation angle") of a radar measurement coordinate system.

2. Description of the Related Art

When the vehicular radar is mounted on a vehicle, due to various factors, a vehicle forward direction may be deviated from the reference axis of the measurement coordinate system of the radar as illustrated in axis deviation examples I and II with respect to an ideal state, as illustrated in FIG. 3. With this deviation, a relative position of a peripheral target with respect to a traveling subject vehicle cannot be obtained.

As a method of detecting the axis deviation angle of the vehicular radar, there is a conventional art using the following principle Expression (1) that is satisfied by an azimuth angle θ and a relative Doppler velocity Vs which are measured with respect to the target, a travel speed Vh of the subject vehicle, a velocity error ratio A included in the relative Doppler velocity Vs and the travel speed Vh of the subject velocity, and an axis deviation angle ψ (see, for example, JP 2002-228749 A).

[Equation 1]

$$\frac{V_s}{V_h} = A \cdot \cos(\theta + \psi) \quad (1)$$

However, the related art suffers from such a problem that not only the axis deviation angle ψ but also the velocity error ratio A must be estimated, and a large number of operation resources are required for an estimating process, which increases the device size, for example.

SUMMARY OF THE INVENTION

The present invention has been made in view of the above-mentioned problem, and therefore has an object to provide a vehicular radar device which is capable of reducing an operation resource quantity necessary for a process of estimating an axis deviation angle, to thereby reduce a device size.

In order to solve the above-mentioned problem, the present invention provides a vehicular radar device including: a measurement unit that measures an azimuth angle and a relative Doppler velocity of a target as target information; a travel speed detection unit that detects a travel speed of a subject vehicle; an angular velocity detection unit that detects a turning velocity of the subject vehicle; an extraction/accumulation unit that extracts target information satisfying conditions related to the relative Doppler velocity of the target, the travel speed of the subject vehicle, and the turning velocity of the subject vehicle, and accumulates the azimuth angle and a velocity ratio obtained by dividing the relative Doppler velocity by the travel speed of the subject vehicle among the extracted target information as new target information; and an axis deviation angle estimate unit that reads the target information accumulated in the extraction/accumulation unit, and estimates an axis deviation angle of a measurement coordinate system of a radar based on a second-order polynomial expression of the azimuth angle of the target.

According to the present invention, only the axis deviation angle is estimated by a simple operation with the use of an approximate expression instead of a principle expression satisfied by the axis deviation angle. This leads to advantages that the operation resource quantity necessary for the process of estimating the axis deviation angle is reduced, to thereby reduce the device size.

DETAILED DESCRIPTION OF THE PREFERRED EMBODIMENTS

Figure 1:
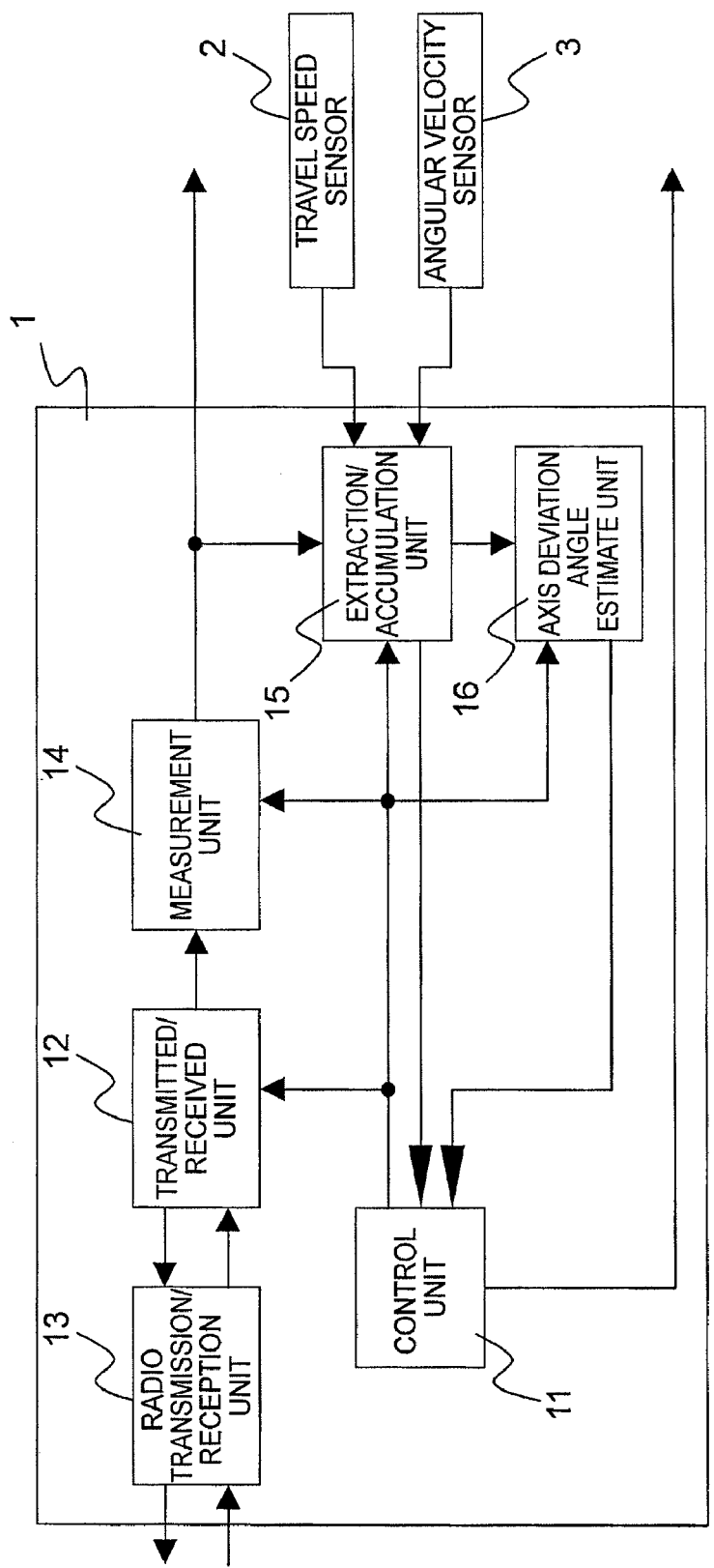
FIG. 1 is a block diagram illustrating a configuration of a vehicular radar device according to an embodiment of the present invention.

Hereinafter, an embodiment of the present invention is described in detail. FIG. 1 is a block diagram illustrating a configuration of a vehicular radar device according to the embodiment of the present invention. A vehicular radar device 1 illustrated in FIG. 1 includes a control unit 11 that controls the respective configurations of the vehicular radar device 1, a transmitted/received unit 12 that generates a transmitted signal, and converts a received electromagnetic wave into a received signal, a radio transmitted/received unit 13 that radiates the transmitted signal generated by the transmitted/received unit 12 into a space as a transmitted electromagnetic wave, and receives the electromagnetic wave reflected by a target or the like, and a measurement unit 14 that measures an azimuth angle and a relative Doppler velocity of the target as target information. The vehicular radar device 1 also includes an extraction/accumulation unit 15 that extracts target information satisfying conditions related to a relative Doppler velocity of the target, a travel speed Vh of the subject vehicle which is detected by a travel speed sensor 2, and a turning velocity of the subject vehicle which is detected by an angular velocity sensor 3, and accumulates the azimuth angle and a velocity ratio obtained by dividing the relative Doppler velocity by the travel speed of the subject vehicle among the extracted target information as new target information. The vehicular radar device 1 further includes an axis deviation angle estimate unit 16 that reads the target information accumulated in the extraction/accumulation unit 15, and estimates the axis deviation angle of the measurement coordinate system of the radar on the basis of a second-order polynomial expression of the azimuth angle of the target.

The control unit 11 includes a dedicated logic circuit, or a general-purpose central processing unit (CPU) having a given program installed therein, or the combination of those elements, and controls the operation timing and so on of the respective components of the vehicular radar device 1, which is described later.

In the transmitted/received unit 12 and the radio transmitted/received unit 13, the transmitted signal generated in the transmitted/received unit 12 on the basis of the control of the control unit 11 is radiated into a space by the transmitted/received unit 13 as a transmitted electromagnetic wave, the electromagnetic wave reflected by the target or the like is received by the radio transmitted/received unit 13, and then converted into a received signal by the transmitted/received unit 12. The measurement unit 14 conducts necessary processing on the received signal, and measures at least the azimuth angle of the target and the relative Doppler velocity. Further, the measurement unit 14 may measure a distance to the target.

The transmitted/received unit 12 is so configured as to realize a frequency modulated continuous wave (FMCW) system, a pulse Doppler system, or the like, which have been known as the radar system, for the purpose of measuring the relative Doppler velocity, and the transmitted/received timing is controlled by the control unit 11. Further, for the purpose of measuring the azimuth angle, the radio transmitted/received unit 13 includes a known mechanism of changing the azimuth for monopulse angle measurement, and a plurality of known radio transmitted/received elements for array signal processing angle measurement. The control of the azimuth, the timing control of radio transmitted/received by the plurality of elements, and so on are controlled by the control unit 11.

The measurement unit 14 in which the input of the received signal and the output timing of the measurement result are controlled by the control unit 11 includes a dedicated logic circuit, a general-purpose CPU and/or digital signal processor (DSP) having a given program installed therein, or the combination of those elements, for the purpose of executing signal processing for measuring the relative Doppler velocity and the azimuth angle.

The azimuth angle and the relative Doppler velocity of the target which have been measured by the measurement unit 14 are transmitted to, for example, an engine control unit (ECU) mounted on the vehicle, and used for selection of an object to be followed by the subject vehicle or motion control of the subject vehicle. The measurement unit 14 outputs the measured azimuth angle and the measured Doppler velocity of the target also to the extraction/accumulation unit 15.

The extraction/accumulation unit 15 receives the outputs of the travel speed sensor 2 of the subject vehicle and the angular velocity sensor 3, and extracts the target information (azimuth angle and relative Doppler velocity) that satisfy the following conditions (1) and (2).

(1) A size (absolute value) of a travel turning radius of the subject vehicle which is calculated from the travel speed sensor 2 and the angular velocity sensor 3 is larger than a predetermined value being regarded as a straight travel.

(2) An absolute velocity of the target which is calculated from the travel speed sensor 2 and the relative Doppler velocity falls within a predetermined range being regarded as a stationary object.

The extraction/accumulation unit 15 accumulates the azimuth angle as it is, and the relative Doppler velocity as a velocity ratio $\gamma$ obtained by dividing the relative Doppler velocity by the travel speed of the subject vehicle among the extracted target information.

Further, the extraction/accumulation unit 15 transmits a signal indicative of accumulation completion to the control unit 11 after the number of pieces of target information (azimuth angle and velocity ratio) has reached a predetermined value.

After receiving the signal indicative of the accumulation completion from the extraction/accumulation unit 15, the control unit 11 transmits a signal indicative of an estimate process start to the axis deviation angle estimate unit 16.

After receiving the signal indicative of the estimate process start from the control unit 11, the axis deviation angle estimate unit 16 reads the target information (azimuth angle and velocity ratio) accumulated in the extraction/accumulation unit 15, and estimates the axis deviation angle.

Hereinafter, a description is given in detail of a method of estimating the axis deviation angle in the axis deviation angle estimate unit 16. A relationship satisfied by an angle $\theta$ of the target, a relative Doppler velocity Vs observed with respect to the target, the travel speed Vh of the subject vehicle, a velocity error ratio A included in the relative Doppler velocity Vs and the travel speed Vh of the subject vehicle, and a measurement coordinate system reference axis deviation angle $\psi$ is shown in the above-mentioned Expression (1). In Expression (1), when Vs/Vh is $\gamma$, and A=1, Expression (2) is satisfied.

[Equation 2]

$$\gamma = \cos(\theta + \psi) \tag{2}$$

In Expression (2), when the right-hand side is approximated by a second-order polynomial expression of $\theta$ as represented by Expression (3), Expression (3) is obtained.

[Equation 3]

$$\gamma = \cos(\theta + \psi) \approx -a(\theta)^2 + b(\theta) + c \tag{3}$$

Figure 2:
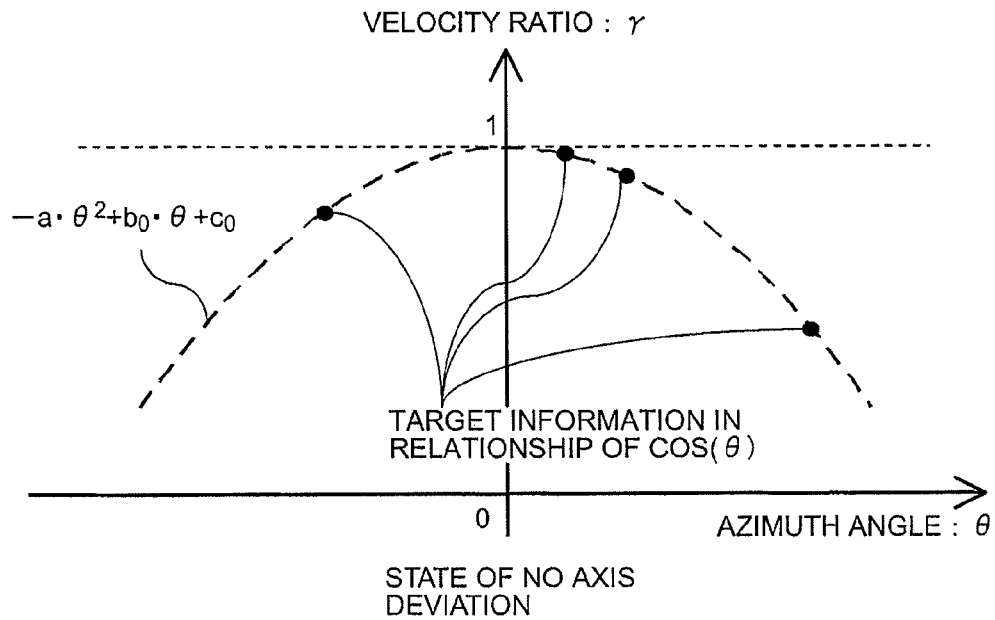
FIG. 2 is an explanatory diagram of a principle of an axis deviation angle estimate according to the embodiment of the present invention.
Figure 2:
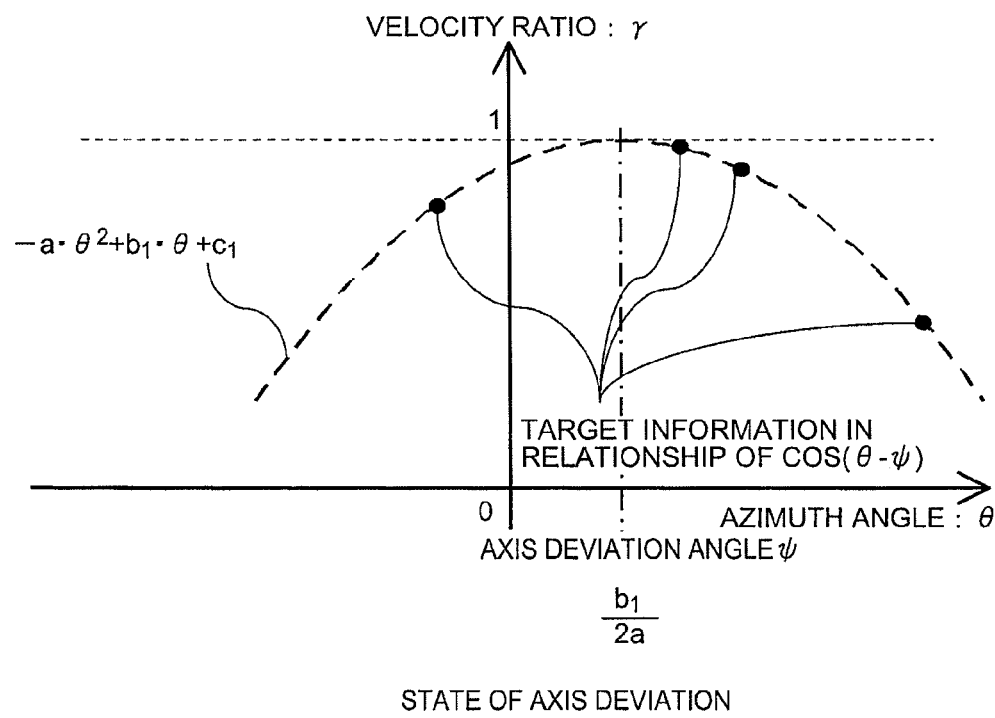
Figure 3:
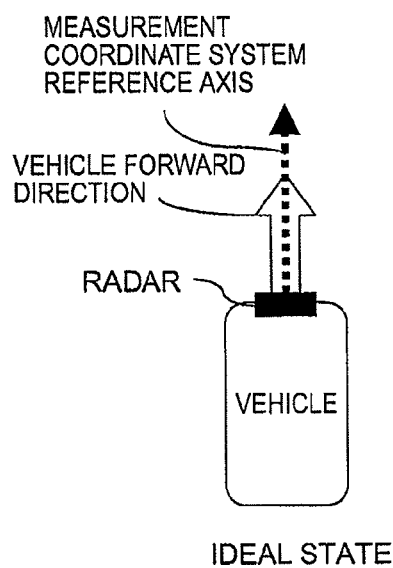
FIG. 3 is an explanatory diagram of an axis deviation in a measurement coordinate system of a radar.
Figure 3:
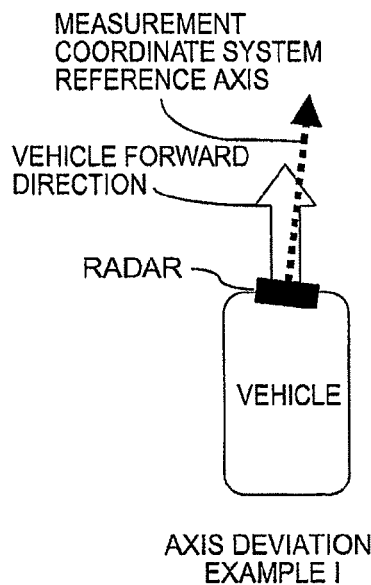
Figure 3:
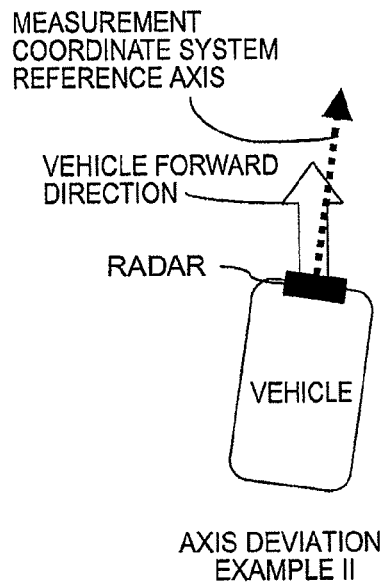

In this case, even if it is assumed that the binomial coefficient a of $\theta$ is a constant value, $\cos(\theta+\psi)$ can be approximated by the second-order polynomial expression by the remaining coefficients b and c as represented by FIG. 2.

When Expression (3) is modified into Expression (4), the axis deviation angle $\psi$ in the original principle Expression (1) can be approximated as a translation quantity b/(2a) on an azimuth angle $\theta$ axis.

[Equation 4]

$$\gamma = -a\left(\theta - \frac{b}{2a}\right)^2 + \frac{b^2}{4a} + c \tag{4}$$

It is assumed that the azimuth angle is $\theta k$ (k=1 to n) and the velocity ratio is $\gamma k$ (k=1 to n) as n pieces of target information accumulated in the extraction/accumulation unit 15, and then the establishment of Expression (5) is assumed.

[Equation 5]

$$\begin{bmatrix} \gamma 1 + a(\theta 1)^2 \\ \gamma 2 + a(\theta 2)^2 \\ \vdots \\ \gamma n + a(\theta n)^2 \end{bmatrix} = \begin{bmatrix} \theta 1 & 1 \\ \theta 2 & 2 \\ \vdots \\ \theta n & 1 \end{bmatrix} \begin{bmatrix} b \\ c \end{bmatrix} \tag{5}$$

$$Y = X \begin{bmatrix} b \\ c \end{bmatrix}$$

In Expression (5), for example, with an aim to find direct solution of the least square method, when a pseudo-inverse matrix of a matrix X is multiplied from the left of both sides, only a coefficient b can be obtained.

[Equation 6]

$$X^{-1} Y = \begin{bmatrix} b \\ c \end{bmatrix} \tag{6}$$

The axis deviation angle ψ can be calculated from the coefficient b and the invariant fixed value a by b/(2×a). Another calculation method may be used in finding the least squares solution in Expression (5).

Further, in the original principle Expression (1), the velocity error ratio A gives a change in the velocity ratio (vertical) axial direction with respect to the target information on a plane of the azimuth angle to the velocity ratio as illustrated in FIG. 2. For that reason, as understood from Expression (4), the influence is liable to appear as a change of the coefficient c, and an influence on the coefficient b is small. Further, when the radar device 1 and the travel speed sensor 2 are normally in operation, a value of the velocity error ratio A is not extremely different from 1, but with an error of about several percentages. From this viewpoint, there arises no problem even if the axis deviation angle ψ is obtained from only the coefficient b in the above-mentioned method.

The extraction/accumulation unit 15 and the axis deviation angle estimate unit 16 described above include a dedicated logic circuit, a memory, a general-purpose CPU, a DSP having a program installed therein, or the combination of those elements.

The axis deviation angle ψ estimated by the axis deviation angle estimate unit 16 is transmitted to, for example, the control unit 11, and when the value of the estimated axis deviation angle ψ falls within a predetermined range, the control unit 11 transmits the value of the axis deviation angle ψ to the measurement unit 14, and the measurement unit 14 corrects the azimuth angle of the target by the quantity of the axis deviation angle ψ, and then outputs the corrected azimuth angle to the ECU mounted on the vehicle, or the like.

Further, for example, when the value of the estimated axis deviation angle which has been transmitted to the control unit 11 is beyond the predetermined range, an abnormality of the radar device output result is notified to a driver via the ECU mounted on the vehicle, or the like.

The present invention is applicable to a case where, in the vehicular radar device, even when the measurement coordinate system reference axis is deviated by various factors after the radar has been mounted on the vehicle, the deviation angle is corrected to output correct target information.

What is claimed is:

1. A vehicular radar device, comprising:
   a measurement unit that measures an azimuth angle and a relative Doppler velocity of a target as target information;
   a travel speed detection unit that detects a travel speed of a subject vehicle;
   an angular velocity detection unit that detects a turning velocity of the subject vehicle;
   an extraction/accumulation unit that extracts target information satisfying conditions related to the relative Doppler velocity of the target, the travel speed of the subject vehicle, and the turning velocity of the subject vehicle, and accumulates the azimuth angle and a velocity ratio obtained by dividing the relative Doppler velocity by the travel speed of the subject vehicle among the extracted target information as new target information; and
   an axis deviation angle estimate unit that reads the target information accumulated in the extraction/accumulation unit, and estimates an axis deviation angle of a measurement coordinate system of a radar based on a second-order polynomial expression of the azimuth angle of the target.

2. A vehicular radar device according to claim 1, wherein when it is assumed that the azimuth angle of the target is θ, the velocity ratio obtained by dividing the relative Doppler velocity by the travel speed of the subject vehicle is γ, and a velocity error ratio included in the relative Doppler velocity and the travel speed of the subject vehicle is 1, the axis deviation angle estimate unit approximates a right-hand side of $$\gamma = \cos(\theta + \psi)$$

that is an expression satisfied by a reference axis deviation angle ψ in the measurement coordinate system of the radar by the second-order polynomial expression of the azimuth angle θ of the target to obtain the following approximate expression, and estimates the axis deviation angle based on the approximate expression, $$\gamma = \cos(\theta + \psi) \approx -a(\theta)^2 + b(\theta) + c$$

where a, b, and c are coefficients.

3. A vehicular radar device according to claim 2, wherein the axis deviation angle estimate unit approximates a binomial coefficient a by an invariant fixed value in the approximate expression to obtain only a monomial coefficient b, and calculates the axis deviation angle to be estimated by b/2a.

4. A vehicular radar device according to claim 1, wherein the extraction/accumulation unit extracts, as the target information that satisfies extraction conditions, target information that a travel turning radius of the subject vehicle which is calculated from the travel speed of the subject vehicle from the travel speed detection unit and the turning velocity of the subject vehicle from the angular velocity detection unit falls within a predetermined range being regarded as a straight travel, and an absolute velocity of the target which is calculated from the travel speed of the subject vehicle from the travel speed detection unit and the relative Doppler velocity from the measurement unit falls within a predetermined range being regarded as a stationary object.

5. A vehicular radar device according to claim 1,
   wherein the extraction/accumulation unit accumulates, as new target information, a predetermined number of the azimuth angles and a predetermined number of the velocity ratios, and
   wherein the axis deviation angle estimate unit reads a plurality of the azimuth angles and a plurality of the velocity ratios each being the new target information from the extraction/accumulation unit, and estimates the axis deviation angle of the measurement coordinate system of the radar.

6. A vehicular radar device according to claim 1, wherein the measurement unit corrects the azimuth angle of the target information which is measured by the radar by using the axis deviation angle estimated by the axis deviation angle estimate unit.

7. A vehicular radar device according to claim 6, further comprising a control unit that transmits, when the axis deviation angle estimated by the axis deviation angle estimate unit falls within a predetermined range, the axis deviation angle estimated by the axis deviation angle estimate unit to the measurement unit and controls so as to correct the azimuth angle of the target information which is measured by the radar and notifies, when the estimated axis deviation angle is beyond the predetermined range, a driver of an abnormality of an output result from the vehicular radar device.

* * * * *